Aug. 2, 1966  H. LOWENTHAL  3,263,562
FOUR ELEMENT SYMMETRICAL REPRODUCTION LENS
Filed Feb. 6, 1963
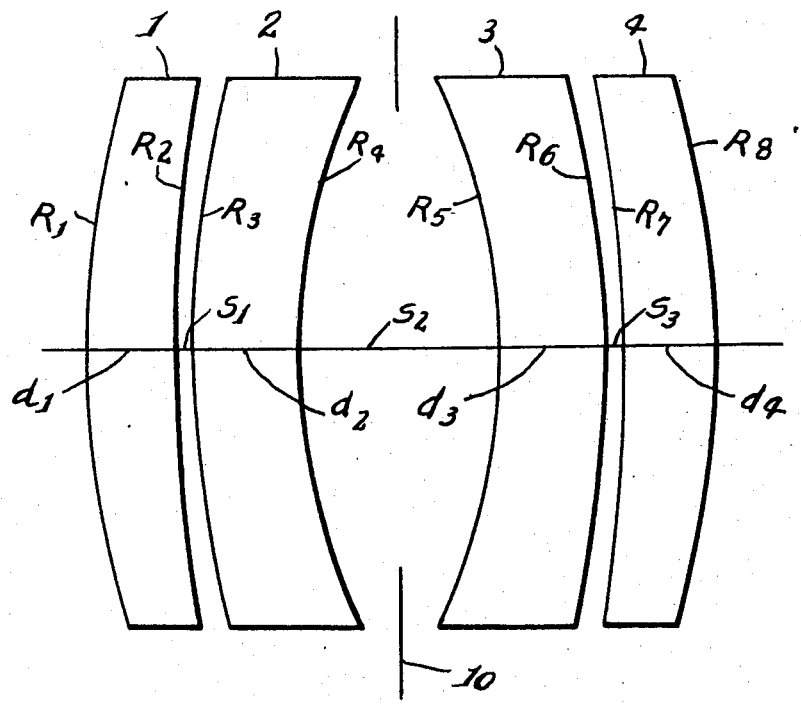
Inventor.
Herman Lowenthal.
By. Zabel Baker York Jones & Wittman
Attorneys.

United States Patent Office 3,263,562
Patented August 2, 1966

3,263,562
FOUR ELEMENT SYMMETRICAL REPRODUCTION LENS
Herman Lowenthal, Chicago, Ill., assignor to General Scientific Corporation, Chicago, Ill., a corporation of Illinois
Filed Feb. 6, 1963, Ser. No. 256,727
2 Claims. (Cl. 88—57)

This invention relates to lenses and more particularly to a symmetrical reproduction lens for photocopy apparatus.

Reproduction lenses, such as those used in photocopy apparatus, should be corrected for spherical aberration, astigmatism, curvature of field, longitudinal chromatic aberration, coma, distortion and chromatic difference in magnification. In addition, it is desirable for the lens to have a wide angle and a short focal length so the lens can be installed in smaller and consequently less expensive apparatus. Also, it is important in copywork for the lens to work well at a 1:1 magnification. However, a 1:1 lens with a wide field of view is unusually difficult to design.

One object of the invention, therefore, is to provide a reproduction lens that can be made economically and satisfies the above-stated requirements.

Other objects, advantages and details of the invention will be apparent as the description proceeds, reference being had to the accompanying drawing wherein the single figure shows diagrammatically a reproduction lens embodying the invention. It will be understood that the description and drawing are illustrative only, and that the scope of the invention is to be measured by the appended claims.

The reproduction lens of this invention is related to the class of four element Gauss type objectives in that each outermost element on either side of the stop is a positive meniscus and the adjacent internal element on either side of the stop is a negative meniscus. The use of lens elements that all are menisci cooperates in providing a wide field of view. Moreover, selecting a design based on a Gauss type objective is desirable because such a lens will be relatively compact and light, and well suited for reproduction work. As shown in the drawing and following data, the lens is symmetrical, thereby giving good correction for coma, distortion, and chromatic difference of magnification.

In particular, as shown in the drawing, the lens consists of four lens elements numbered consecutively from front to rear, with the light assumed to come from the left or front of the lens. Lens elements 1 and 2 are in the front half of the lens, and lens elements 3 and 4 are in the rear half, a stop 10 being located between the two lens groups. Outermost lens elements 1 and 4 on opposite sides of stop 10 are identical, as are lens elements 2 and 3. Thus, only two different types of lens elements need be ground to form the lens.

In addition, the lens elements are ground, and the glass forming the lens elements is selected, so that axial aberrations are generally independently corrected in each half of the lens, and off-axis aberrations in the front lens elements 1 and 2 are corrected by the rear lens elements 3 and 4.

As stated above, and as shown in the drawing, all lens elements are menisci. With this arrangement, a wide angle field of view is possible. In particular, if the lens elements are selected and ground according to the table below, the lens will have a 60° field of view, and the object to image distance will be shortened 25 percent in comparison to prior reproduction lenses. Thus, a substantial reduction in the size and cost of the apparatus in which the lens is to be installed may be achieved.

A wide angle lens that produces a flat image field must have a rather low Petzval sum. Accordingly, the system must include strong enough negative curvatures. Since the focal length of the lens depends both on the power and position of the elements, and the Petzval curvature depends on the power of the crown glass lens elements and the position of the flint glass lens elements, a judicious selection of the powers and positions of the lens elements supplies enough degrees of freedom to provide a reasonably flat Petzval surface, and thus a sharp image.

In particular, the crown glass used in lenses 1 and 4 has a refractive index lower than that of the flint glass used in lens elements 2 and 3. Despite this, the Petzval radius is more than four times the focal length (Petzval sum 0.224). Consequently, the lens has a desirably flat field. This is accomplished by selecting the thickness of the flint glass in lenses 2 and 3 (0.049) so it is thicker than that of the crown glass (0.042).

The optical data for the lens shown in the drawing is as follows:

[Speed—F:4.5. Effective focal length—1.0063. Back focal distance—0.8663]

| Lens | Radii, thickness, spacing | $N_d$ | V |
|---|---|---|---|
| 1, 4 | $R_1 = -R_8 = +0.2696$<br>$d_1 = d_4 = 0.042$<br>$R_2 = -R_7 = +1.0270$<br>$s_1 = s_3 = 0.005$ | 1.588 | 61.2 |
| 2, 3 | $R_3 = -R_6 = +0.3347$<br>$d_2 = d_3 = 0.049$<br>$R_4 = -R_5 = +0.1870$<br>$s_2 = 0.090$ | 1.617 | 36.6 |

$R_1, R_2 \ldots$ represent the radius of curvature of the individual lens elements.

$d_1, d_2 \ldots$ represent the axial thickness of the individual lens elements.

$s_1, s_2 \ldots$ represent the axial spacing of the individual lens elements.

$N_d$ represents the refractive index of the glass in the lens elements.

V represents the dispersion index.

It will be noted from the table that the second and third lens elements have a greater axial thickness and a higher refractive index than the first and fourth lens elements. Also, the V number of the first and fourth lens elements is considerably greater than that of the second and third lens elements.

The lens designed in accordance with the optical data listed in the above table will have many important features not found in prior reproduction lenses. For one thing, the color correction even if not apochromatic is highly satisfactory for process work. The relative illumination of the lens measures close to 50 percent. The lens, in addition to working well at a 1:1 magnification ratio, works well for magnifications other than 1:1. In addition, the lens, which has a 60 degree field of view, easily can be made in focal lengths like 3 inches, whereas the shortest focal length of prior process lenses is about 4 inches. Furthermore, the center space in the lens readily accommodates an iris diaphragm.

From the above description it is thought that the construction and advantages of this invention will be readily apparent to those skilled in the art. Various changes in detail may be made without departing from the spirit or losing the advantages of the invention as limited in the appended claims.

Having thus described the invention, what is claimed as new and desired to secure by Letters Patent is:

1. A four element symmetrical reproduction lens of speed substantially F:4.5 of four singlets only comprising a front portion having first and second lens elements and a rear portion having third and fourth lens elements, said second and third lens elements having greater axial thickness and higher refractive index than said first and fourth lens elements, wherein the radii of curvature of the outside surfaces of said first and fourth lens elements respectively are +0.2696 and −0.2696 times the effective focal length of the lens, the radii of curvature of the inside surfaces of said first and fourth lens elements respectively are +1.0270 and −1.0270 times the effective focal length of the lens, the radii of curvature of the outside surfaces of said second and third lens elements respectively are +0.3347 and −0.3347 times the effective focal length of the lens and the radii of curvature of the inside surfaces of said second and third lens elements respectively are +0.1870 and −0.1870 times the effective focal length of the lens, said first and fourth lens elements having a focal length of +0.6092 times the effective focal length of the lens and said second and third lens elements having a focal length of −0.7863 times the effective focal length of the lens.

2. A reproduction lens having numerical data substantially as follows:

[Speed—F:4.5. Effective focal length—1.0063. Back focal distance—0.8663]

| Lens | Radii, thickness, spacing | $N_d$ | V |
|---|---|---|---|
| 1, 4 | $R_1 = -R_8 = +0.2696$<br>$d_1 = d_4 = 0.042$<br>$R_2 = -R_7 = +1.0270$<br>$s_1 = s_3 = 0.005$ | 1.588 | 61.2 |
| 2, 3 | $R_3 = -R_6 = +0.3347$<br>$d_2 = d_3 = 0.049$<br>$R_4 = -R_5 = +0.1870$<br>$s_2 = 0.090$ | 1.617 | 36.6 |

$R_1, R_2 \ldots$ represent the radius of curvature of the individual lens elements.

$d_1, d_2 \ldots$ represent the axial thickness of the individual lens elements.

$s_1, s_2 \ldots$ represent the axial spacing of the individual lens elements.

$N_d$ represents the refractive index of the glass in the lens elements.

V represents the dispersion index.

References Cited by the Examiner
UNITED STATES PATENTS

| | | | |
|---|---|---|---|
| 759,537 | 5/1904 | Martin | 88—57 |
| 2,865,252 | 12/1958 | Reiss | 88—57 |

FOREIGN PATENTS 21,211 Great Britain _____ of 1901

JEWELL H. PEDERSEN, *Primary Examiner.*

JOHN K. CORBIN, *Examiner.*

R. J. STERN, *Assistant Examiner.*